(12) United States Patent
Anderson et al.

(10) Patent No.: US 8,629,771 B2
(45) Date of Patent: Jan. 14, 2014

(54) PROXIMITY SENSORS

(76) Inventors: John Anderson, Derby (GB); Aled Hughes, Staffordshire (GB)

(*) Notice: Subject to any disclaimer, the term of this patent is extended or adjusted under 35 U.S.C. 154(b) by 273 days.

(21) Appl. No.: 12/862,761

(22) Filed: Aug. 25, 2010

(65) Prior Publication Data

US 2011/0050446 A1    Mar. 3, 2011

(30) Foreign Application Priority Data

Sep. 1, 2009  (GB) .................................. 0915182.0
Feb. 15, 2010  (GB) .................................. 1002476.8

(51) Int. Cl.
*G08B 13/18* (2006.01)

(52) U.S. Cl.
USPC ........................................................ 340/552

(58) Field of Classification Search
USPC ........... 340/541, 545.2, 545.3, 552, 554, 567, 340/686.6
See application file for complete search history.

(56) References Cited

U.S. PATENT DOCUMENTS

| | | | |
|---|---|---|---|
| 3,174,148 A | | 3/1965 | Cartwright |
| 3,418,649 A | * | 12/1968 | Williamson .................. 340/507 |
| 4,242,669 A | * | 12/1980 | Crick ............................. 340/567 |
| 4,581,700 A | * | 4/1986 | Farnham et al. ................. 700/80 |
| 4,910,464 A | * | 3/1990 | Trett et al. ...................... 327/517 |
| 5,243,326 A | * | 9/1993 | Disabato ........................ 340/555 |
| 5,499,016 A | * | 3/1996 | Pantus ........................... 340/555 |
| 5,541,609 A | * | 7/1996 | Stutzman et al. .............. 343/702 |
| 5,942,976 A | * | 8/1999 | Wieser et al. .................. 340/565 |
| 5,956,626 A | * | 9/1999 | Kaschke et al. ............. 455/115.1 |
| 5,959,533 A | | 9/1999 | Layson, Jr. et al. |
| 6,111,503 A | * | 8/2000 | Javitt et al. .................... 340/552 |
| 6,191,688 B1 | * | 2/2001 | Sprouse ......................... 340/506 |
| 6,239,698 B1 | * | 5/2001 | Porter et al. ................... 340/506 |
| 6,633,252 B2 | * | 10/2003 | Stolarczyk et al. ............. 342/22 |

(Continued)

FOREIGN PATENT DOCUMENTS

| | | |
|---|---|---|
| GB | 1316087 A | 5/1973 |
| GB | 2341504 A | 3/2000 |
| WO | WO 89/02635 | 3/1989 |

*Primary Examiner* — Daniel Wu
*Assistant Examiner* — Son M Tang
(74) *Attorney, Agent, or Firm* — Rebecca J. Brandau

(57) ABSTRACT

A proximity sensor can be used with a device that relies on GPS signals or other radio-frequency (RF) signals. The proximity sensor can be used to determine if the signals are being deliberately blocked by an object such as metal foil placed near it. The sensor includes an oscillator 2, a directional coupler 4 and an antenna 8. A third port 6c of the directional coupler acts as a coupled port when RF power that has been transmitted by the antenna 8 is reflected back to the antenna by a blocking object. The reflected RF power passes along a main line of the directional coupler 4 and a proportion is coupled to the third port 6c. A detector provides an alert if the magnitude of the power of the transmit signal that is reflected back to the antenna 8 in the form of a receive signal exceeds a threshold.

17 Claims, 1 Drawing Sheet

(56) References Cited

U.S. PATENT DOCUMENTS

| | | |
|---|---|---|
| 6,987,392 B1 | 1/2006 | Hernandez et al. |
| 7,113,087 B1 | 9/2006 | Casebolt et al. |
| 7,210,791 B2 | 5/2007 | Vinson et al. |
| 7,259,658 B2 * | 8/2007 | Noguchi et al. ......... 340/426.26 |
| 7,532,151 B2 * | 5/2009 | Touge et al. .................... 342/27 |
| 7,733,226 B2 * | 6/2010 | Richard .................... 340/545.7 |
| 2003/0062907 A1 | 4/2003 | Nevermann |
| 2003/0179098 A1 | 9/2003 | Ghazarian |
| 2004/0229560 A1 | 11/2004 | Maloney |
| 2009/0160706 A1 | 6/2009 | Oh et al. |
| 2010/0090825 A1 | 4/2010 | Freathy |

* cited by examiner

PROXIMITY SENSORS

FIELD OF THE INVENTION

The present invention relates to proximity sensors, and in particular to proximity sensors that can be used to detect the close proximity of an object that might be used to block an electromagnetic signal.

BACKGROUND ART

The proximity sensor can be designed to be incorporated into a monitoring tag that might be secured around the appendage of an individual, for example. The monitoring tags can include a location detection means for detecting if the individual has moved outside a designated area within which electromagnetic (e.g. radio-frequency or RF) signals can be exchanged between the monitoring tag and a base unit. The monitoring tags can also include a global positioning system (GPS) device that uses electromagnetic signals (e.g. GPS signals) to determine the location of the individual and to track and record their movement. The proximity sensor can also be designed to be incorporated into a portable tracking device that is carried or worn by the individual and which receives RF signals from a separate monitoring tag that is secured to the individual. The portable tracking device will normally include a GPS device that uses GPS signals to determine the location of the individual and to track and record their movement. As such, the tags and/or portable tracking devices can be worn by hospital patients, the elderly, children or offenders and can raise an alarm or notify an authorised person if they move into or outside a designated area.

It is possible to deliberately block the electromagnetic signals by placing an object such as a sheet of metal foil, for example, around the housing of the monitoring tag or the portable GPS tracking device. There is therefore a need for a proximity sensor to determine if the electromagnetic signals are being deliberately blocked in an attempt to incapacitate or disable the monitoring tag or portable GPS tracking device.

SUMMARY OF THE PRESENT INVENTION

The present invention provides a proximity sensor for use with a device that relies on the transmission and/or receipt of a main electromagnetic signal that can be blocked by an object being placed in proximity to the device, the proximity sensor including an oscillator; an antenna for transmitting and receiving electromagnetic signals; a directional coupler having a first port and a second port connected together by a main line and a third port and a fourth port connected together by a coupled line, the first port being connected to the oscillator, the second port being connected to the antenna, and the third port being connected to a detector and acting as an isolated port of the directional coupler when a transmit signal is supplied from the oscillator to the antenna along the main line and as a coupled port when a receive signal is supplied from the antenna to the oscillator along the main line; wherein the oscillator is controlled to provide a transmit signal to the antenna along the main line of the directional coupler and wherein the detector provides an alert indicating the presence of a blocking object if the magnitude of the power of the transmit signal that is reflected back to the antenna in the form of a receive signal exceeds a threshold.

When there is no blocking object in the proximity of the device then the transmit signal that is provided from the oscillator to the antenna through the directional coupler will be radiated, approximately omni-directionally, away into free space. However, if a blocking object such as a sheet of metal foil, for example, is placed in close proximity to the antenna then a significant proportion of the radiated power of the transmit signal will be reflected back to the antenna and onto the third port (coupled port) of the directional coupler. The return loss of the antenna is therefore effectively used as the means for detecting the presence or absence of a blocking object.

In the case where the proximity sensor is intended to be incorporated into a device such as a monitoring tag or a portable tracking device, for example, that might be carried or worn close to the body of an individual then it will be readily appreciated that the body can produce unwanted reflections of the transmit signal back to the antenna even when no blocking object is present. If such reflections are detected then they can lead to false positive alerts. The proximity sensor is therefore preferably designed to provide an alert only if an object that might be used to block the transmission and/or receipt of the main electromagnetic signal is detected to be in the proximity of the device. The positioning of the antenna within the device can be an important factor in minimising reflections from the body. For example, the antenna may be positioned so that it is spaced away from the body when the device is in use. Spacing the antenna about a quarter wavelength (or a significant part thereof) of the transmit signal away from the body may have the effect of minimising the proportion of the radiated power of the transmit signal that is reflected back to the antenna by the body of the individual. The detector threshold or any other structural or operational feature of the proximity sensor or its associated device can be selected to enable the proximity sensor to distinguish properly between reflections from the body and those from a blocking object.

The magnitude of the reflected power is monitored by the detector that is connected to the third port of the directional coupler. If the magnitude of the reflected power exceeds a set threshold then the detector will provide an alert. The alert can take any suitable form including an audible or visual alert, the setting of an alert flag, or the transmission of an alert signal to a base unit or control centre, for example. The transmission of the alert signal may be delayed until it has been determined that the blocking object has been removed.

The oscillator can be configured to supply a continuous or pulsed transmit signal to the antenna. To minimise temperature drift issues that are often present in conventional RF detectors, and enhance detection sensitivity, then the detector can be configured to receive a pulsed receive signal. The oscillator can be on/off modulated such that the receive signal that is coupled to the detector is a pulsed signal.

The detector can include a detector diode that converts the power of the continuous or pulsed receive signal to a dc or ac voltage. The detector can also include a Schmitt trigger circuit that monitors the voltage provided by the detector diode and provides an alert if the voltage exceeds a set threshold. The threshold may be fixed or variable and can be set with regard to the design of the proximity sensor and its intended operating parameters.

The proximity sensor preferably uses radio-frequency or RF components.

The proximity sensor can be configured such that the oscillator is controlled to provide a continuous or pulsed transmit signal continually or at timed intervals, for example. However, the oscillator will normally be turned off or placed in a standby mode and then controlled to provide a transmit signal to the antenna on detection that the main electromagnetic signal is not being properly transmitted or received. In other words the proximity sensor can be turned on only once a preliminary detection has been made that the main electromagnetic signal is not being properly transmitted or received.

That preliminary detection may be carried out by any associated detection circuit. The proximity sensor is therefore used to check if the main electromagnetic signal is not being properly transmitted or received because it is being deliberately blocked due to the proximity of a blocking object such as a sheet of metal foil, for example, or for some other reason.

Once the proximity sensor has been turned on then it may continue to operate and provide a continuous or pulsed transmit signal continually or at timed intervals until the proximity sensor detects that the blocking object is no longer present (e.g. until the magnitude of the reflected power at the third port of the directional coupler falls below a set threshold). The proximity sensor can also be turned off or placed in a standby mode after a predetermined amount of time has lapsed or if the associated detection circuit detects that the main electromagnetic signal is being properly transmitted or received again, for example.

The device that is associated with the proximity sensor preferably includes a primary antenna that is used to transmit and/or receive the main electromagnetic signal. The primary antenna can be used as the antenna of the proximity sensor. For example, if the oscillator is only controlled to provide a transmit signal on detection that the main electromagnetic signal is not being transmitted and/or received (e.g. the proximity sensor is turned on once a preliminary detection has been made by a detection circuit) then the oscillator can supply the transmit signal to the primary antenna of the device. The proximity sensor can therefore use the primary antenna of the device to determine if the loss of the main electromagnetic signal is the result of it being blocked by a blocking object by detecting the proportion of radiated power of the transmit signal that is reflected back to the primary antenna. If the oscillator is controlled to provide a transmit signal either continually or at timed intervals without any preliminary detection that the main electromagnetic signal is not bring transmitted and/or received then the proximity sensor will normally require its own dedicated antenna to avoid interfering with the main electromagnetic signal.

The proximity sensor is particularly suitable to be incorporated into a monitoring tag or a portable tracking device that comprises a primary antenna for transmitting and/or receiving a main electromagnetic signal (e.g. a GPS signal). In this case the antenna of the proximity sensor is preferably located substantially adjacent to the primary antenna of the monitoring tag or portable tracking device. The alert provided by the proximity sensor may be provided to the control unit of the monitoring tag or portable tracking device and used for any suitable purpose. For example, the detector may cause an alert flag to be set within the control unit of the monitoring tag or portable tracking device.

However, it will be readily appreciated that the proximity sensor may be used with, or incorporated into, any suitable device that relies on the transmission and/or receipt of a main electromagnetic signal. Other suitable devices might, for example, include alarm systems and tracker systems, such as car alarms that use GPS or GSM signals to track the location of vehicles, mobile telephones and other portable electronic devices.

These and other features and advantages of the invention may be readily appreciated from the following detailed description of the preferred embodiments and by reference to the accompanying drawings.

DETAILED DESCRIPTION OF PRACTICAL EMBODIMENTS

Figure 1:
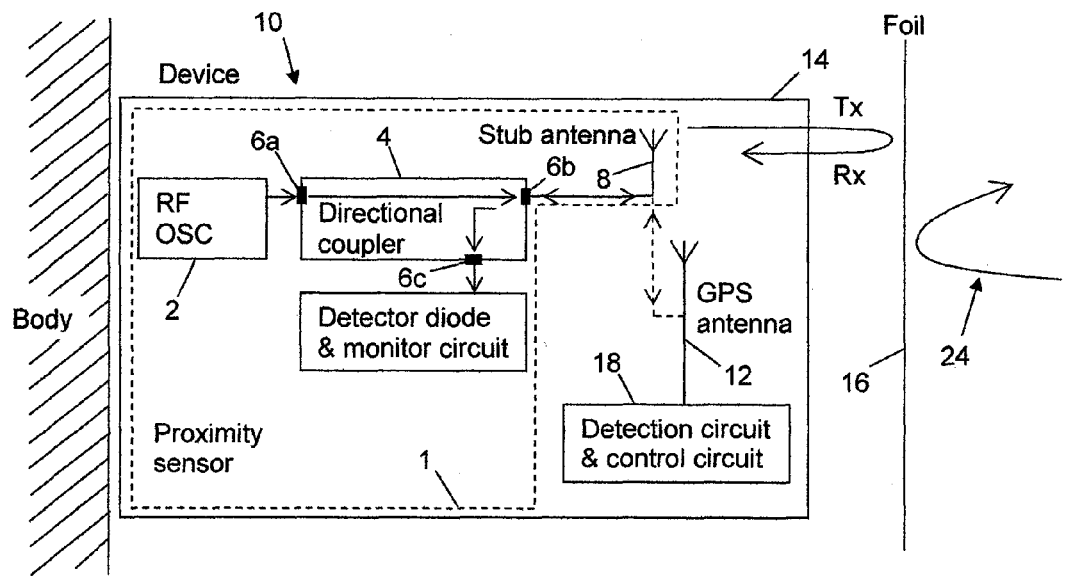
FIG. 1 is a schematic diagram showing a foil sensor according to the present invention.

A foil sensor 1 according to the present invention will be described with reference to FIGS. 1 and 2. To aid integration, the foil sensor 1 is preferably small, low cost and uses surface mount technology. A preferred operating frequency for the foil sensor is 2.45 GHz because this is a popular ISM band and suitable RF components are readily available from commercial suppliers.

The foil sensor 1 includes a low power RF oscillator 2. An RF directional coupler 4 has a first port 6a and a second port 6b. A third port 6c operates either as an isolated port or a coupled port depending on the direction of RF power flow through the directional coupler 4. This will be explained in more detail below.

The first port 6a is connected to the oscillator 2 by a 50Ω transmission line.

The second port 6b is connected to a stub antenna 8 such as a printed quarter wave stub antenna.

The foil sensor 1 is incorporated into a device 10 such as a monitoring tag (e.g. an offender tag) that is worn close to the body of an individual, or a portable tracking device. The device 10 includes a GPS antenna 12 for receiving the GPS signals 24 that allow the monitoring tag or portable tracking device to track its location. The stub antenna 8 is positioned adjacent the GPS antenna 12 within a housing 14 of the device. In some arrangements the stub antenna 8 can be omitted completely and the second port 6b is connected to the GPS antenna 12 instead. The foil sensor 1 will normally be turned off or in a standby mode (e.g. a low quiescent current mode) to minimize battery load. When the GPS signals 24 are lost then the foil sensor 1 is turned on to determine if the GPS signals 24 are being deliberately blocked. However, the foil sensor 1 can also be configured to operate continually or at time intervals.

To minimise battery loading the power chosen for the oscillator 2 is around 1 mW.

When the foil sensor 1 has been turned on, the oscillator 2 provides a transmit signal to the stub antenna 8 (or the GPS antenna 12) and this passes along a main line of the directional coupler 4 which connects the first port 6a to the second port 6b. The transmit signal can be continuous or pulsed. At the operating frequency of the foil sensor the match of the stub antenna 8 is typically better than −15 dB so very little RF power is reflected back to the directional coupler 4.

If the GPS signals 24 are unexpectedly lost then there is a possibility that a sheet of metal foil 16, e.g. aluminum foil, has been wrapped around the housing 12 of the monitoring tag or portable tracking device. To test for this the foil sensor 1 is turned on by the control circuit 18 of the monitoring tag or portable tracking device and a transmit signal is supplied to the stub antenna 8 from the oscillator 2. RF power is radiated by the stub antenna 8. If metal foil is in close proximity to the stub antenna 8 then it will cause an RF short circuit at the stub antenna. In practice, the presence of the metal foil 16 changes the return loss for the stub antenna 8 from better than −15 dB to worse than −3 dB. The short circuit reflects RF power back to the stub antenna 8 in the form of a receive signal and along the main line of the directional coupler 4. It will be readily appreciated that the receive signal is effectively that part of the transmit signal which has been reflected back to the stub antenna 8 by the metal foil 16.

A proportion of the reflected RF power that passes along the main line from the second port 6b to the first port 6a is coupled to the third port 6c which is operating as a coupled port. A fourth port (not shown) in this case operates as an isolated port and typically has an isolation of better than −30 dB and is terminated in a 50Ω load. (It will be appreciated that when the transmit signal passes along the main line of the directional coupler 4 from the oscillator 2 to the stub antenna 8 then the third port 6c operates as an isolated port.)

Figure 2:
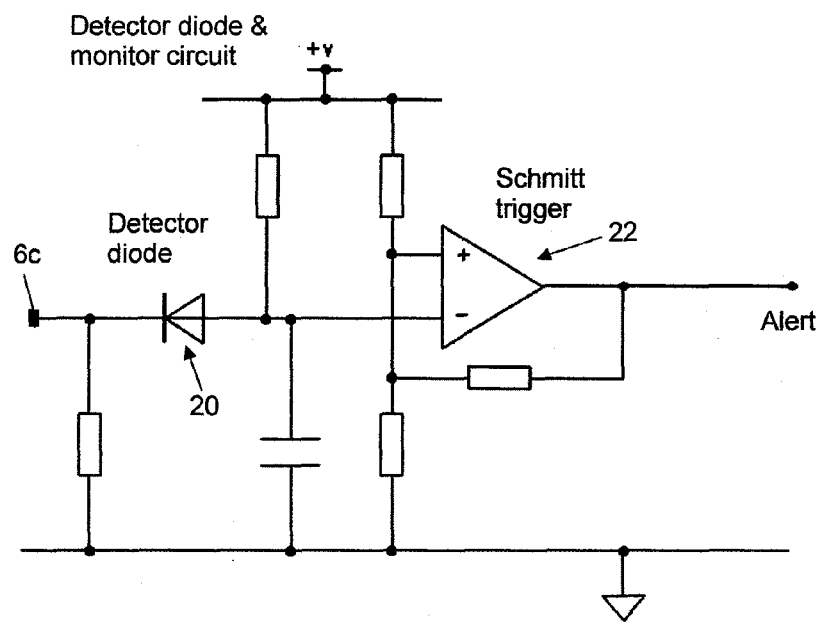
FIG. 2 is a schematic diagram showing a detector.

The third port 6c is connected to an RE detector diode 20 that is shown in FIG. 2. The detector diode 20 converts the coupled RF power at the third port 6c to a dc or ac voltage that is proportional to the coupled RF power. This voltage is monitored by a Schmitt trigger circuit 22 the output of which changes state to provide an alert in the form of a foil detection flag if the voltage exceeds a set threshold.

What is claimed is:

1. A device that relies on the transmission and/or receipt of a main electromagnetic signal that can be blocked by an object being placed in proximity to the device, the device incorporating a primary antenna for transmitting and/or receiving the main electromagnetic signal and a proximity sensor comprising:
   an oscillator;
   an antenna for transmitting and receiving electromagnetic signals located adjacent to the primary antenna;
   a directional coupler having a first port and a second port connected together by a main line and a third port and a fourth port connected together by a coupled line, the first port being connected to the oscillator, the second port being connected to the antenna of the proximity sensor, and the third port being connected to a detector and acting as an isolated port of the directional coupler when a transmit signal is supplied from the oscillator to the antenna of the proximity sensor along the main line and as a coupled port when a receive signal is supplied from the antenna of the proximity sensor to the oscillator along the main line;
   wherein the oscillator is controlled to provide a transmit signal to the antenna of the proximity sensor along the main line of the directional coupler and wherein the detector provides an alert indicating the presence of a blocking object if the magnitude of the power of the transmit signal that is reflected back to the antenna of the proximity sensor in the form of a receive signal exceeds a threshold.

2. The device of claim 1, wherein the detector includes a detector diode that converts the power of the receive signal to a dc or ac voltage.

3. The device of claim 2, wherein the detector includes a Schmitt trigger circuit that monitors the voltage provided by the detector diode and provides an alert if the voltage exceeds a set threshold.

4. The device of claim 1, wherein the transmit signal is a continuous transmit signal.

5. The device of claim 1, wherein the transmit signal is a pulsed transmit signal.

6. The device of claim 1, wherein the oscillator is controlled to provide a transmit signal continually or at timed intervals.

7. The device of claim 1, wherein the oscillator is controlled to provide a transmit signal on detection that the main electromagnetic signal is not being transmitted and/or received.

8. The device of claim 1, wherein the antenna of the proximity sensor is located adjacent to the primary antenna.

9. The device of claim 1, wherein the antenna of the proximity sensor is positioned within the device so that it is spaced away from a body when the device is in use.

10. The device of claim 9, wherein the antenna of the proximity sensor is positioned within the device so that it is spaced away from the body by about a quarter wavelength of the transmit signal when the device is in use.

11. The device of claim 1, being a monitoring tag.

12. The device of claim 1, being a portable tracking device.

13. A device that relies on the transmission and/or receipt of a main electromagnetic signal that can be blocked by an object being placed in proximity to the device, the device incorporating a primary antenna for transmitting and/or receiving the main electromagnetic signal and a proximity sensor comprising:
    an oscillator;
    a directional coupler having a first port and a second port connected together by a main line and a third port and a fourth port connected together by a coupled line, the first port being connected to the oscillator, the second port being connected to the primary antenna, and the third port being connected to a detector and acting as an isolated port of the directional coupler when a transmit signal is supplied from the oscillator to the primary antenna along the main line and as a coupled port when a receive signal is supplied from the primary antenna to the oscillator along the main line;
    wherein the oscillator is controlled to provide a transmit signal to the primary antenna along the main line of the directional coupler on detection that the main electromagnetic signal is not being transmitted and/or received; and
    wherein the detector provides an alert indicating the presence of a blocking object if the magnitude of the power of the transmit signal that is reflected back to the primary antenna in the form of a receive signal exceeds a threshold.

14. The device of claim 13, wherein the detector includes a detector diode that converts the power of the receive signal to a dc or ac voltage.

15. The device of claim 14, wherein the detector includes a Schmitt trigger circuit that monitors the voltage provided by the detector diode and provides an alert if the voltage exceeds a set threshold.

16. The device of claim 13, being a monitoring tag.

17. The device of claim 13, being a portable tracking device.

* * * * *